United States Patent Office 3,278,496
Patented Oct. 11, 1966

3,278,496
THIOL TERMINATED LIQUID POLYMERS
Gene M. Le Fave, Whittier, and Frank Y. Hayashi, San Pedro, Calif., assignors, by mesne assignments, to Diamond Alkali Company, Cleveland, Ohio, a corporation of Delaware
No Drawing. Filed Mar. 1, 1961, Ser. No. 92,444
5 Claims. (Cl. 260—79)

This invention relates to thiol terminated liquid polymers, and useful elastomeric products derived therefrom, and to processes for producing the same.

It is an object of this invention to provide improved thiol terminated liquid polymers and particularly thiol terminated derivatives of polyoxyalkylene glycols of intermediate molecular weights, and new and unique processes for producing the same.

It is another object of this invention to provide liquid thiol terminated polymers having improved characteristics and advantages over systems using conventional liquid polymers.

Certain classes of elastomeric compounds have been developed and have found great favor in industry by virtue of the fact that they can be cast-in-place in liquid or paste phase and subsequently cured at ambient temperatures and pressures or, if desired, upon slight heating to form solid, rubbery materials. These compounds, generally known as castable elastomers, have found use in the electrical industry as potting, insulating and encapsulating compounds; in the building and aircraft industry as sealants, coatings and caulking and glazing compounds; and in the missile industry as solid fuel binders.

Liquid polymers which are used for castable elastomers include silicones, polysulfides and polyurethanes. The silicone resins are used only where their outstanding heat resistant properties warrant their high cost. Where such high heat resistance is not necessary, the polysulfides and polyurethanes are generally used.

Compounds based upon polysulfide liquid polymers are characterized by: outstanding ease of processing; good stability; ease of application; moderately high cost of the base polymer; and curing by chemical reactions, such as oxidation and addition of terminal thiol groups. Compounds based upon polyurethanes are characterized by: sensitivity to moisture during processing, in storage and during application; a comparatively low raw material cost; and curing by chemical reaction, such as addition of labile hydrogen to isocyanate compounds, of terminal hydroxyl groups. With polyurethanes great care must be taken to exclude all moisture from the system, not only because water becomes a reactant, but even more importantly because carbon dioxide gas evolved as a by-product.

Accordingly, it is a further object of this invention to provide a castable elastomer which combines the best properties of the polysulfide and urethane systems without the most objectionable accompanying disadvantages. For example, the present invention embodies the ease of processing and application of the polysulfides; the low cost of the polyurethane; and the possibility of cure by chemical reaction of terminal thiol groups.

The liquid thiol terminated polymers of the present invention may be further polymerized by conventional means to form castable elastomers and may, if desired, be further compounded by various known means to produce sealants, caulking compounds, coatings, adhesives, glazing compounds, potting compounds, and solid fuel binders.

In general, the compounds of the present invention are formed by terminating with thiol groups certain polyoxyalkylene glycols; the glycols are synthesized initially by the modification of an initiating polyhydric alcohol or amine with alkylene oxides.

More specifically, the glycol polymer is a hydroxy terminated liquid polyoxyalkylene glycol polymer having the formula:

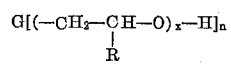

In the above formula G represents a polyvalent radical obtained by removing the active hydrogen from a polyhydric initiating compound consisting of either amines or alcohols having a functionality of from three to seven with respect to the active hydrogen and having less than seven carbon atoms; R is either hydrogen, an alkyl group of from one to four carbons, a halogen substituted alkyl group having one to four carbons, or a phenyl group; $x$ is a number such that the molecular weight of the glycol is at least four hundred; and $n$ is from three to seven.

The above glycol is reacted with at least an equivalent amount, based upon the number of functional groups, of an organic monomer consisting of either:

(a) An episulfide responding to the formula:

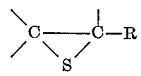

where R is from the following: hydrogen and alkyl groups of one to four carbons.

(b) A thiol substituted organic acid responding to the formula:

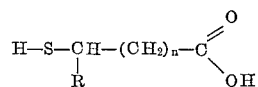

where R is from the class consisting of H, carboxy and alkyl groups of one to four carbons, and $n$ is a number from zero to four.

(c) A methyl ester of the acid described under (b) above.

(d) An ethyl ester of the acid described under (b) above.

(e) Epichlorohydrin, in which case an intermediate polymer is formed which, by reactions such as dehydrohalogenation, addition and replacement, can be chemically altered to form the desired final polymer.

This synthesis of the thiol terminated polyalkylene glycol has been accomplished by chemical reaction involving the hydroxyl group of the polyoxyalkylene glycol or by a series of chemical reactions in which the termination of the polyoxyalkylene glycol is changed from hydroxyl to thiol or to a thiol containing compound. A number of suitable different chemical reactions are possible for synthesis of the glycol adduct, the choice to be made on a selection of utility and economy. Of particular interest are reactions of the hydroxyl group with acid to form esters and with halogenated compounds to form reactive intermediates.

Polyoxyalkylene glycols, which are also known as polyalkylene oxides, polyglycols, polyethers, polyetherglycols, and polyalkylene glycols, are alkylene oxide derivatives of polyfunctional alcohols and amines. Commonly used alkylene oxides include ethylene, propylene, and butylene. Initiating alcohols and amines commonly used are ethylene glycol, propylene glycol, butylene glycol, trimethylol propane, 1,2,6-hexanetriol, glycerol, and ethylenediamine. Most of these are commercially available and are known by a variety of trade names. The molecular weights of these polyoxyalkylene glycols range from several hundred to about 10,000. Those which are made predominantly of ethylene oxide are solid and find use generally as waxes and lubricants. They are not as useful in the preparation of the compounds of the present invention as those which are predominantly propylene or butylene, because the latter are generally liquid even at high molecular weight and because they have better resistance to water.

Preferably, although not necessarily, the glycol adducts of the present invention are those having a molecular weight of at least four hundred and which constitute a condensation product of an alkylene oxide having from two to four carbon atoms and about 0.1 to 16.5 mole percent, based upon the alkylene oxide, of a polyhydric alcohol having less than seven carbon atoms and having three to six hydroxy groups, at least forty percent of the alkylene oxide having more than two carbon atoms.

The polyoxyalkylene glycol adduct of the present invention can be used either alone or in combination of others of the same general configuration, thus making it possible to attain a wide range of physical properties in the ultimate product. For example, by varying the molecular weight and degree of functionality such properties as elongation, tensile strength and hardness can be controlled.

Thiol termination may be effected in a number of ways including esterification and transesterification, addition to halogenated epoxy compounds followed by epoxidation and hydrogen sulfide addition; addition to halogenated epoxy compounds followed by replacement of the halogen by thiol.

Preferred reactants with the glycol are episulfides and epichlorohydrin. In the case of the episulfide a second polymer is formed which is thiol terminated. In the case of the epichlorohydrin reactive intermediates are formed which lead to thiol termination by dehydrohalogenation, addition and replacement reactions.

The products of the present invention have in general a viscosity of from 100 to 15,000 centipoise, an acid value of from less than one up to fifty, and an equivalent weight of from 150 to 3,000, as determined by the thiol content.

When synthesizing by esterification it has been found that the functionality of the polyoxyalkylene glycol should be at least three. Acids preferably used in the synthesis are thiol substituted organic acids. Their generalized formula is as follows:

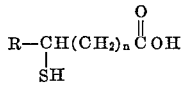

In the above formula R represents a group consisting of hydrogen, carboxy and alkyl groups of from one to ten carbons; and $n$ is a number from zero to ten.

Thioglycolic and beta-thiol propionic acid have also shown particular utility for the purposes of this invention.

Normal esterification procedures may be used in the synthesis, such as the use of a solvent for azeotropic removal of the water and the use of neutral or weakly ionic esterification and transesterification catalysts. Suitable catalysts which have been used are: tetraisopropyl titanate, tetrabutyl titanate, tetrakis (2-ethylhexyl) titanate, tetrastearyl, titanate, tetraoctylene glycol titanate, titanium acetyl-acetonate, stannous oxalate, sodium acetate, dibutyl tin oxide, aluminum acetate and litharge.

The ratio of hydroxyl group to carboxylic acid group may be varied from 1:1 to 1:1.6.

In general the castable elastomer forming the end product of the present invention is one responding to the following formula:

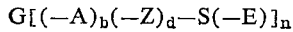

where: G is the polyvalent radical obtained by removing the active hydrogen from a hydroxy terminated liquid polyoxyalkylene glycol having a molecular weight of at least 400 and which is a condensation product of an alkylene oxide having from two to four carbon atoms and having about 0.01 to 16.5 mole percent, based on the alkylene oxide, of a polyhydric alcohol having less than 7 carbon atoms and having three to six hydroxy groups, at least 40 percent of said alkylene oxide having more than two carbon atoms; A is from the class consisting of carbonyl group and alkyl group of one to four carbons; $b$ is a number from zero to two; Z is selected from the group consisting of alkyl groups of one to five carbons and hydroxy substituted alkyl groups of one to five carbons; $d$ is a number from zero to four; E is from the group consisting of hydrogen, thiol substituted alkyl groups of one to eight carbons, thiol substituted aryl groups, and thiol substituted aryl-alkyl groups, the alkyl groups being of one to eight carbons; $n$ is a number from three to seven.

The process of the present invention produces generally liquid polymers having a viscosity of from 100 to 15,000 centipoises, an acid value of less than 50, and an equivalent weight of 150 to 3,000 as determined by the thiol content. Stated generally the process of the present invention consists of reacting a hydroxy terminated liquid polyoxyalkylene glycol polymer having a molecular weight of at least 400 which is a condensation product of an alkylene oxide having from two to four carbon atoms, and about 0.01 to 16.5 mole percent, based on the alkylene oxide, of a polyhydric alcohol having less than 10 carbon atoms and having three to six hydroxy groups, at least 40 percent of said alkylene oxide having more than two carbon atoms, said reaction process being selected from the group of processes consisting of: esterification and transesterification; reactions with thiol substituted organic acids and esters to form thiol terminated esters of the polyoxyalkylene glycol; addition reactions with halogenated epi-compounds to form reactive halogenated intermediates followed by subsequent replacement of the halogen by a thiol group; and reactions with halogenated epi-compounds and the formulation of reactive glycidyl ether intermediates followed by addition reactions with hydrogen sulfide and polythiol compounds.

Various processes have been employed successfully for synthesizing the product of the present invention. Specific examples of successful processes falling within the scope of the present invention and which produce the compounds of the present invention are as follows:

The following is an illustration of the adduct synthesis by esterification.

EXAMPLE 1

In a 500 ml., 3-neck, round bottom flask which was equipped with a heating mantle, mechanical stirrer, thermometer, reflux condenser and a barrett type distillation receiver to collect the condensation water, was placed 0.2 equivalent of polyoxyalkylene glycol, 27.5 grams (0.3 mole) thioglycolic acid and about 10 ml. toluene. The distillation receiver was filled with toluene and during the reaction period, the amount of toluene was adjusted to regulate the processing temperature. With vigorous stirring, the above mixture was processed at 175–180° C. until the theoretical amount of water had been collected in the receiver. The solvent and unreacted thioglycolic acid were then removed under vacuum distillation. The adduct was obtained as an almost colorless to amber liquid and very slight viscosity increase was obtained over that of the starting materials.

EXAMPLE 2

Using the method of Example 1, the polyoxyalkylene glycols listed below were reacted with thiolglycolic acid to produce the thiol terminated liquid polymers. By end group analysis for thiol groups, the equivalent weights were obtained and the average figures are shown.

Although it is theoretically possible to replace the chloride directly with a thiol group, for example $$RCl + NaSH \rightarrow RSH + NaCl$$

it has been found that this type of reaction does not proceed to as high a degree of completion as is desirable, at least in this system.

Thiol termination of the chloride can be accomplished if another intermediate is prepared, replacing the halide by a group more readily reacted, thiosulfate. The thiosulfate intermediate then can be processed to the final thiol derivative.

$$R-Cl \xrightarrow{Na_2S_2O_3} R-S_2O_3Na \xrightarrow{NaSH} RSH$$

EXAMPLE 8.—THIOSULFATE INTERMEDIATE

In an appropriate size flask equipped with a stirrer, reflux condenser and thermometer was placed 0.4 equivalent of the chloride intermediate as prepared in Example 7, and 0.5 mole $Na_2S_2O_3 5H_2O$ added as a 40% aqueous solution. The mixture was stirred vigorously under a reflux for 24 hours. After cooling, the aqueous layer was separated and discarded.

EXAMPLE 9.—THIOL ADDUCT

To 0.4 equivalent of the thiosulfate intermediate as prepared in Example 8 was added 0.44 equivalent sodium hydrosulfide as a 20% aqueous solution. The mixture was stirred under reflux for 7 hours. After cooling, the aqueous layer was separated and the organic layer was heated under vacuum to remove the solvents.

The thiol terminated adduct thus prepared had a slight degree of chain extension and was suitable to be used as a liquid polymer for the preparation of castable elastomers.

Another convenient synthesis of the thiol derivatives of polyoxyalkylene glycols involves an epoxide intermediate.

EXAMPLE 10.—EPOXIDE INTERMEDIATE

To 1.0 equivalent of the chloride intermediate as prepared in Example 7, was added about 4.3 equivalents of sodium hydroxide as a 40% aqueous solution and a volume of toluene sufficient to make about a 60% solids mixture. This was refluxed at 100° C. for 5 hours. The mixture was then cooled and the aqueous layer separated by decanting. Toluene was then removed by heating under reduced pressure. Epoxidation proceeds very well and, analysis indicates, with about 95% efficiency.

EXAMPLE 11.—THIOL ADDUCT

To 0.25 equivalent of the epoxide intermediate as prepared in Example 10, were added 0.5 gram of sodium hydrosulfide and sufficient dimethyl formamide to make about a 40–50% solids solution. With good stirring and keeping the temperature at 10° C., hydrogensulfide was dispersed through the mixture in excess of about 300% and over a period of 3 hours. After removal of the excess hydrogen sulfide and solvent, the adduct was isolated with an excellent percentage of thiol termination.

The thiol terminated derivatives of polyoxyalkylene glycols, prepared as in the above examples, are useful polymers for the development of castable elastomers.

These compounds have properties which make them ideally suited as caulking, sealing, potting, encapsulating and coating materials.

The polymers of this disclosure have the advantage that their chemical reactivity is similar to the polysulfide liquid polymers; thus the well developed technology of the polysulfide liquid polymers can be readily applied to the new polymers by those already skilled in the art. Some of these methods are described in the following examples:

EXAMPLE 12.—CURE BY ADDITION

Part 1

A prepolymer with reactive ethylenic termination was prepared of divinyl sulfone and a thiol terminated derivative of polyoxyalkylene glycol. (Note copending patent application Serial No. 30,782, filed May 23, 1960, now U.S. Patent 3,138,573.) The glycol was Pluronic TPE 4542 and the method of synthesis was similar to Example 3. The equivalent weight of the thiol adduct was 2120.

The reactive ethylenic termination was accomplished by mixing together in a reaction vessel 1.0 equivalent of the thiol adduct and 1.9 equivalent of divinyl sulfone. While stirring 0.1% triethylene diamine was added. After a slight exotherm, the reaction was heated to 70° C. and held 4 hours at this temperature.

After cooling, the resin was blended with an equal weight of precipitated calcium carbonate reinforcing filler and passed over a 3 roll paint mill.

Part 2

The thiol adduct used in Part 1 was blended with an equal weight of precipitated calcium carbonate, 0.3% by weight of triethylene diamine and the mixture dispersed on a 3 roll paint mill.

Part 3

A castable elastomer, suitable as a self levelling joint sealant, was prepared by blending the above 2 parts in the following ratio:

| | Grams |
|---|---|
| Part 1 | 285 |
| Part 2 | 190 |

The compound had set in 4 hours and after 20 hours, its Shore "A" hardness was 40. After 7 days, the following properties were observed:

| | |
|---|---|
| Ultimate elongation _____percent__ | 700 |
| Ultimate tensile strength _____p.s.i__ | 340 |
| Shore "A" hardness _____ | 47 |

EXAMPLE 13.—CURE BY OXIDATION

Part 1

The thiol adduct of Pluronic TPE 4542 and prepared as in Example 3 was compounded in the following manner and dispersed on a 3 roll paint mill.

| | Parts by weight |
|---|---|
| Thiol adduct | 100 |
| Precipitated $Ca(CO_3)_2$ | 100 |
| Tetramethyl thiuram disulfide | 0.5 |
| | 200.5 |

Part 2

An $MnO_2$ oxidant was dispersed in an inert plasticizer, using a ball mill.

| | Parts by weight |
|---|---|
| $MnO_2$ | 50 |
| Inert plasticizer | 50 |
| | 100 |

Part 3

A solid elastomer was prepared by blending the two parts.

| | Parts by weight |
|---|---|
| Part 1 | 100 |
| Part 2 | 10 |
| | 110 |

The cure time was within 12 hours. After 7 days, the following properties were noted:

| | |
|---|---|
| Ultimate elongation _____percent__ | 400 |
| Ultimate tensile strength _____p.s.i__ | 212 |
| Hardness (Shore "A") _____ | 43 |

EXAMPLE 14.—CURE BY OXIDATION

A thiol derivative of Polyglycol 112-3 was prepared using the methods of Examples 7, 10 and 11. Its equiva-

| Polyoxyalkylene Glycol | | Thiol Terminated Adduct (Equivalent Weight per Thiol Group) |
|---|---|---|
| Trade Name | Equiv. Weight (average) | |
| Niax Triol LHT 112 | 500 | 752 |
| Pluracol TP-440 | 143 | 250 |
| Pluracol TP 1540 | 510 | 875 |
| Pluracol TP 4040 | 1,325 | 2,000 |
| Polyglycol 112-3 | 900 | 1,500 |
| Tetronic 304 | 425 | 930 |
| Tetronic 702 | 850 | 910 |
| Pluracol TPE 4542 | 1,450 | 2,200 |

A series of "Niax Triol LHT" resins is produced by the Union Carbide Chemical Company. These are polypropylene oxide derivatives of 1,2,6-hexanetriol. Pluracol TP resins represent a series of polypropylene oxide derivatives of trimethylol propane. They are manufactured by the Wyandotte Chemicals Corporation. Polyglycol 112-3, manufactured by the Dow Chemical Company, is an ethylene oxide terminated polyoxypropylene derivative of glycerol. It is also known by the trademark Voranol CP-3001. The "Tetronic" polyols, manufactured by the Wyandotte Chemicals Corporation, are a series of ethylene oxide terminated polyoxypropylene derivatives of ethylene diamine. Pluracol TPE 4542, manufactured by the Wyandotte Chemicals Corporation, is an ethylene oxide terminated polyoxypropylene derivative of trimethylol propane.

EXAMPLE 3

In much the same manner, thiol terminated adducts may be prepared by using a catalyst during the esterification.

In a 1000 ml. round bottom, 3-neck flask, equipped as in Example 1, was placed 0.44 equivalent polyoxyalkylene glycol, 50 grams (0.544 mole) thioglycolic acid and 30 grams toluene. The distillation receiving flask was filled with toluene and the amount of toluene was adjusted during the process to keep the temperature at 180–190° C. With vigorous agitation, the esterification reaction was continued until about 95% of the theoretical amount of water had been collected and the rate of water removal had slowed down appreciably. Tetrabutyl titanate (0.5% by weight based upon the weight of reactants) was added and the processing continued for one hour. (Alternately, the catalyst can be added in increments during the reaction period.)

EXAMPLE 4

Using the method of Example 3, the polyoxyalkylene glycols listed below were reacted with thioglycolic acid to produce thiol terminated liquid polymers. The equivalent weights per thiol group were determined by end group analysis.

| Polyoxyalkylene Glycol | | Thiol Terminated Weight (Equivalent Weight) |
|---|---|---|
| Trade Name | Equiv. Weight | |
| Niax Triol LHT 67 | 870 | 1,200 |
| Niax Triol LHT 42 | 1,430 | 2,000 |
| Pluracol TP 1540 | 510 | 720 |
| Pluracol TP 2540 | 840 | 1,300 |
| Pluracol TP 4040 | 1,325 | 2,400 |
| Polyglycol 112-3 | 900 | 1,500 |
| Pluracol TPE 4542 | 1,450 | 2,380 |

Thiol terminated adducts may also be prepared by transesterification with the appropriate esters of the thiol substituted organic acids. Useful are methyl and ethyl esters and the diesters of ethylene glycol such as the following: methyl thioglycolate, ethyl thioglycolate, methyl beta-thiolproprionate, ethyl beta-thiolpropionate and ethylene bis-thioglycolate.

Ester interchange catalysts which were described earlier are useful in the reaction. The procedure is shown in Example 5.

EXAMPLE 5

In a 1000 ml. round bottom flask, equipped as in Example 1, was placed 1.0 equivalent of the ester of the thiol substituted acid and 0.5% by weight of catalyst. With good agitation and under an inert gas flow, the reaction was taken to 170° C. and held for 24 hours. The excess monomers were then removed by vacuum distillation.

EXAMPLE 6

The following chart indicates some of the adducts obtained by transesterification.

| Polyoxyalkylene Glycol | | Ester | Thiol Adduct, Equiv. Weight |
|---|---|---|---|
| Trade Name | Equiv. Weight | | |
| Pluracol TP 1540 | 5 | Ethylene bis-thioglycolate | 752 |
| Pluracol TP 2540 | 840 | Methyl thioglycolate | 1,250 |
| Do | 840 | Ethylene bisthioglycolate | 1,275 |
| Pluracol TP 4040 | 1,325 | do | 1,700 |
| Pluracol TPE 4542 | 1,450 | do | 2,100 |

Whereas the adducts of the prior examples were prepared by a direct, one step synthesis, it is also possible to obtain suitable adducts by proceeding through active intermediates. Such alternate methods of synthesis are desirable to prepare a more chemically stable adduct. This increased stability can be attained by using chemical reactions other than esterification, since the ester group is particularly susceptible to alkaline hydrolysis.

One type of intermediate is a halogen-substituted compound. The halogen can then be replaced by a thiol group using conventional methods.

A convenient preparation of the halogen intermediate is that of utilizing epichlorohydrin. The ready availability, low cost and high order of reactivity makes epichlorohydrin a particularly useful chemical for this purpose.

EXAMPLE 7.—HALOGEN INTERMEDIATE

To a 3-neck round bottom flask fitted with a stirrer, thermometer and reflux condenser are added 1.0 equivalent of polyoxyalkylene glycol, 1.1 equivalent of epichlorohydrin and 0.2% by weight of stannic chloride, as catalyst. With stirring, the mixture was heated to 160° C. and held for 3 hours.

Virtually all the epichlorohydrin had reacted at the end of this period, as was indicated by vacuum stripping at the end of the reaction time.

The halogen intermediate can be treated in several ways:

(1) By replacement of the chloride by thiol either directly or indirectly.

(2) By epoxidation and subsequent addition of hydrogen sulfide or a dithiol compound.

Graphically these methods can be outlined as follows:

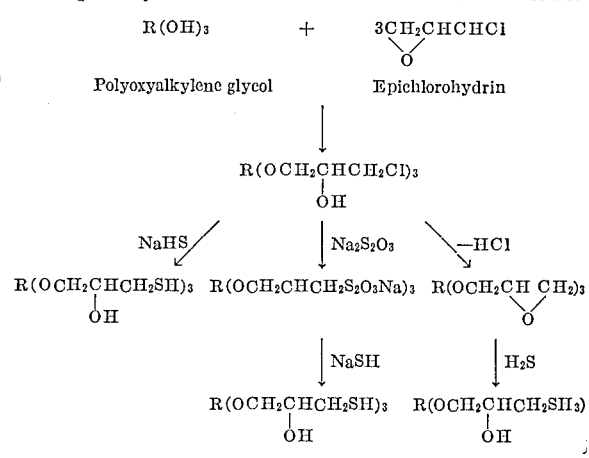

lent weight was 1385. A two component castable elastomer was prepared as follows:

*Part 1*

| | Parts by weight |
|---|---|
| Thiol derivative | 200 |
| Precipitated calcium carbonate | 200 |
| Tetramethyl thiuram disulfide | 1.0 |
| Triethylene diamine | 0.5 |
| | 401.5 |

*Part 2*

| | Parts by weight |
|---|---|
| $MnO_2$ | 20 |
| Inert plasticizer | 20 |
| | 40 |

After blending the two parts a solid rubber was obtained at room temperatures. It had a hardness (Shore "A") of 35 and was suitable for use as a caulking and sealing compound.

EXAMPLE 15.—CURE BY OXIDATION

A thiol derivative was prepared of Polyglycol 112–3 using the methods of Examples 7, 8, and 9. Its equivalent weight was 3500. The following two part formula produced a cured rubber having a hardness (Shore "A") of 25.

*Part 1*

| | Parts by weight |
|---|---|
| Thiol adduct | 100 |
| Precipitated $Ca(CO_3)_2$ | 100 |
| Tetramethyl thiuram disulfide | 0.5 |
| Triethylene diamine | 0.2 |
| | 200.7 |

*Part 2*

| | Parts by weight |
|---|---|
| $MnO_2$ | 10 |
| Inert plasticizer | 10 |
| | 20 |

EXAMPLE 16.—CURE BY ADDITION TO EPOXIDE GROUPS

The thiol derivatives also react with epoxide groups and can be used as a co-reactant, or copolymer, with epoxy resins. It is possible to obtain a wide range of hardness depending upon the ratio of epoxy-thiol. The following chart indicates some properties that can be attained by varying the ratio between (1) an epoxy resin of about 195–200 equivalent weight and (2) a thiol derivative of TP 740 processed by the methods of Example 3, and having an equivalent weight of about 390.

| Weight ratio, epoxy to thiol: | Hardness, Shore "D" |
|---|---|
| 100–20 | 80 |
| 100–40 | 80 |
| 100–100 | 70 |
| 100–150 | 26 |

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claims.

What is claimed is:
1. A liquid polymer formed as a reaction product of:
(1) a hydroxy terminated liquid polyoxyalkylene glycol polymer having the following formula:

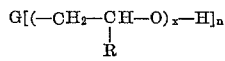

where G is the polyvalent radical obtained by removing more than 2 of the active hydrogens from a polyhydric initiating compound selected from the class consisting of amines and alcohols, and which have a functionality of three to seven with respect to the active hydrogen and have less than 7 carbon atoms: R is from the class of compounds consisting of hydrogen, alkyl group of 1 to 4 carbons, halogen substituted alkyl group of 1 to 4 carbons, and phenyl groups; x is a number such that the molecular weight of the glycol is at least 400; n is a number from 3 to 7; and
(2) at least an equivalent amount, based on the number of functional groups of an organic monomer, said monomer being from the class consisting of:
  (a) a thiol substituted organic acid responding to the formula

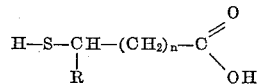

where R is from the class consisting of H and alkyl groups of 1 to 4 carbons, and n is a number from zero to 4.
  (b) a methyl ester of the acid described under (a) above
  (c) an ethyl ester of the acid described under (a) above.
2. A liquid polymer formed as a reaction product of
(1) a hydroxy terminated liquid polyoxyalkylene glycol polymer having a molecular weight of at least 400 which is a condensation product of an alkylene oxide having from 2 to 4 carbon atoms and about 0.01 to 16.5 mole percent based on the alkylene oxide, of a polyhydric alcohol having less than 7 carbon atoms and having 3 to 6 hydroxy groups, at least 40 percent of said alkylene oxide having more than 2 carbon atoms, and
(2) at least an equivalent amount, based upon the number of functional groups, of an organic monomer, selected from the class consisting of thioglycolic acid and beta thiol propionic acid.
3. A liquid polymer formed as a reaction product of
(1) a hydroxy terminated liquid polyoxyalkylene glycol polymer such as would constitute the polymerization product of an alkylene oxide and a polyhydric initiating compound where the alkylene oxide responds to the following formula:

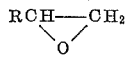

where R is from the group consisting hydrogen, alkyl group of 1 to 4 carbons, halogen substituted alkyl group of 1 to 4 carbons, and phenyl group; and the polyhydric initiating compound is present at about 0.01 to 16.5 mole percent based upon the alkylene oxide, and is selected from the class of compounds consisting of amines, and alcohols which have a functionality of 3 to 7, with respect to the active hydrogen and have less than 7 carbon atoms, said polyoxyalkylene glycol being terminated with hydroxy groups, being polyfunctional in a range of 3 to 7, inclusive, with respect to the hydroxy group and having a molecular weight of at least 400; and
(2) at least an equivalent amount, based on the number of functional groups, of an organic monomer selected from the class consisting of, a thiol substituted organic acid having the formula:

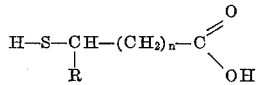

where R is from the class consisting of H and alkyl groups of 1 to 4 carbons, and $n$ is a number from zero to 4, methyl and ethyl esters of said thiol substituted organic acid.

4. A process for the production of liquid polymers having a viscosity of from 100 to 15,000 centipoises, an acid value of less than 50, and an equivalent weight of 150 to 3,000 as determined by the thiol content, said process consisting of the reaction of a hydroxy terminated liquid polyoxyalkylene glycol polymer having a molecular weight of at least 400 which is a condensation product of an alkylene oxide having from 2 to 4 carbon atoms, and about 0.01 to 16.5 mole percent, based on the alkylene oxide, of a polyhydric alcohol having less than 10 carbon atoms and having 3 to 6 hydroxy groups, at least 40 percent of said alkylene oxide having more than two carbon atoms, said reaction process further consisting of esterification and transesterification reactions with thiol substituted organic acids and esters to form thiol terminated esters of the polyoxyalkylene glycol.

5. A process for the production of liquid polymers having a viscosity of from 100 to 15,000 centipoises, an acid value of less than 50, and an equivalent weight of 150 to 3,000 as determined by the thiol content, said process consisting of the reaction of a hydroxy terminated liquid polyoxyalkylene glycol polymer having a molecular weight of at least 400 which is a condensation product of an alkylene oxide having from 2 to 4 carbon atoms and about 0.01 to 16.5 mole percent based on the alkylene oxide of a polyhydric alcohol having less than 10 carbon atoms and having 3 to 6 hydroxy groups, at least 40% of said alkylene oxide having more than 2 carbon atoms, said reaction process further consisting of reaction with a halogenated epi-compound and the formation of a reactive glycidyl ether intermediate followed by addition reaction with hydrogen sulfide.

References Cited by the Examiner

UNITED STATES PATENTS

| 2,633,458 | 3/1953 | Shokal | 260—79 |
| 2,721,800 | 10/1955 | Morgan | 96—67 |
| 2,831,830 | 4/1958 | Schroeder | 260—79 |
| 2,949,474 | 8/1960 | Murdoch | 260—2 |

OTHER REFERENCES

Gluckman et al.: J. Polymer Science, vol. 37, pp. 411–423, June 1959.

LEON J. BERCOVITZ, *Primary Examiner.*

HAROLD N. BURSTEIN, *Examiner.*

J. C. MARTIN, M. I. MARQUIS, *Assistant Examiners.*

UNITED STATES PATENT OFFICE
CERTIFICATE OF CORRECTION

Patent No. 3,278,496            October 11, 1966

Gene M. Le Fave et al.

It is hereby certified that error appears in the above numbered patent requiring correction and that the said Letters Patent should read as corrected below.

Column 1, line 53, after "gas" insert -- is --; column 3, line 16, for "0.1" read -- 0.01 --; column 4, line 42, for "formulation" read -- formation --; column 6, line 74, for that portion of the formula reading "$R(OCH_2CH\ CH_2SH_3)$" read -- $R(OCH_2CH\ CH_2SH)_3$ --; column 10, line 10, for "groups" read -- group --; column 11, line 22, for "centipoises" read -- centipoise --.

Signed and sealed this 29th day of August 1967.

(SEAL)
Attest:

ERNEST W. SWIDER            EDWARD J. BRENNER
Attesting Officer            Commissioner of Patents